United States Patent
Shah et al.

(10) Patent No.: US 6,720,699 B1
(45) Date of Patent: Apr. 13, 2004

(54) KEYBAR VOLTAGE AND CURRENT REDUCTION FOR A POWER GENERATOR ASSEMBLY

(75) Inventors: Manoj R. Shah, Latham, NY (US); Sameh R. Salem, Rexford, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/279,908

(22) Filed: Oct. 25, 2002

(51) Int. Cl.[7] ................................................ H02K 1/00
(52) U.S. Cl. ........................................ 310/197; 310/182
(58) Field of Search ................................. 310/182, 197, 310/258, 259, 256

(56) References Cited

U.S. PATENT DOCUMENTS

| | | | |
|---|---|---|---|
| 3,987,325 A | * 10/1976 | Wilson et al. | 310/256 |
| 5,796,191 A | * 8/1998 | Schwanda | 310/58 |
| 5,869,912 A | 2/1999 | Andrew et al. | 310/52 |
| 6,025,666 A | 2/2000 | Kliman | 310/156.53 |
| 6,104,116 A | 8/2000 | Fuller et al. | 310/217 |
| 6,127,761 A | 10/2000 | Shen et al. | 310/260 |
| 6,429,567 B1 | 8/2002 | Shah et al. | 310/197 |
| 6,462,457 B2 | 10/2002 | Shah et al. | 310/259 |

FOREIGN PATENT DOCUMENTS

JP   57-78334   5/1982

* cited by examiner

Primary Examiner—Dang Le
(74) Attorney, Agent, or Firm—Banner & Witcoff, Ltd.

(57) ABSTRACT

A power generator that operates at a reduced keybar voltages and currents, flange currents, and keybar voltage differentials includes a keybar shield that reduces the amount of magnetic flux coupling into a keybar of multiple keybars during operation of the generator. By reducing the amount of coupled flux, the keybar shield reduces a keybar voltage and a keybar current in a keybar, reduces keybar current flowing into a flange, and reduces a voltage differential between voltages induced by the flux in the multiple keybars.

48 Claims, 18 Drawing Sheets

KEYBAR VOLTAGE AND CURRENT REDUCTION FOR A POWER GENERATOR ASSEMBLY

FIELD OF THE INVENTION

The invention relates generally to a power generator, and in particular to reduction of keybar voltages in a power generator.

BACKGROUND OF THE INVENTION

In order to improve generator efficiency and reduce generator size, generator manufacturers are constantly endeavoring to improve the thermal performance of the generator. For example, a prior art design of a high power electrical generator 100 is illustrated in FIGS. 1 and 2. FIG. 1 is an end view of a cross-section of generator 100 from an isometric perspective. FIG. 2 is a cut-away view of generator 100 along axis 2—2. As shown in FIGS. 1 and 2, electrical generator 100 includes a substantially cylindrical stator 102 housing a substantially cylindrical rotor 110. Power generator 100 further includes multiple axially oriented keybars 118 that are circumferentially distributed around an outer surface of the stator 102. Each keybar 118 is mechanically coupled to the outer surface of stator 102. Each keybar 118 is further mechanically coupled at each of a proximal end and a distal end to one of multiple flanges 204. The multiple keybars 118, together with the multiple flanges 204, form a keybar cage around stator 102.

An inner surface of stator 102 includes multiple stator slots 106 that are circumferentially distributed around an inner surface of stator 102. Each stator slot 106 is radially oriented and longitudinally extends approximately a full length of stator 102. Each stator slot 106 receives an electrically conductive stator winding (not shown).

Rotor 110 is rotatably disposed inside of stator 102. An outer surface of rotor 110 includes multiple rotor slots 114 that are circumferentially distributed around the outer surface of rotor 110. Each rotor slot 114 is radially oriented and longitudinally extends approximately a full length of rotor 110. An air gap exists between stator 102 and rotor 110 and allows for a peripheral rotation of rotor 110 about axis 130.

Each rotor slot 114 receives an electrically conductive rotor winding (not shown). Each rotor winding typically extends from a proximal end of rotor 110 to a distal end of the rotor in a first rotor slot 114, and then returns from the distal end to the proximal end in a second rotor slot 114, thereby forming a loop around a portion of the rotor. When a direct current (DC) voltage differential is applied across a rotor winding at the proximal end of rotor 110, an electrical DC current is established in the winding. Similar to the rotor windings, each stator winding typically extends from a proximal end of stator 102 to a distal end of the stator in a first stator slot 106, and then returns from the distal end of the stator to the proximal of the stator in a second stator slot 106, thereby forming a stator winding loop.

FIG. 3 is a partial perspective of generator of 100 and illustrates a typical technique of constructing a stator core 104. As shown in FIG. 3, stator core 104 includes multiple ring-shaped lamination packets 302 that are stacked one on top of another in order to build up the core. A gap 303 between adjacent packets allows for ventilation to cool rotor 110 and stator core 104. One design of stator core 104 further includes subdividing each lamination packet 302 into multiple lamination segments 304. A radially outer surface of each lamination segment 304 includes at least one slot 120 (not shown in FIG. 3) that aligns with one of the multiple keybars 118. Each keybar in turn includes an outer side 124 and an inner, or locking, side 122 that mechanically mates with one of the multiple slots 120. Stator core 104 is then constructed by sliding each lamination segment 304, via one of the multiple slots 120, into the keybar cage formed by the multiple keybars 118. The coupling of each slot of the multiple slots 120 of a lamination segment 304 with a locking side 122 of a keybar 118 affixes each lamination segment in position in stator 102.

A rotation of rotor 110 inside of stator 102 with a DC current in the multiple windings of rotor 110 establishes a magnetic flux in the generator. A portion of the magnetic flux that passes through stator 102, spills outside of the outer surface of stator 102 coupling into each of the multiple keybars 118. The coupling of magnetic flux into each of multiple keybars 118 can induce keybar voltages and thus setup keybar currents in each keybar. One possible result is a development of a voltage differential between keybar voltages produced in each of two different keybars 118. When adjacent keybars 118 are coupled to adjacent lamination segments, a voltage differential between the adjacent keybars 118 may also appear across the adjacent lamination segments. The voltage differential between adjacent lamination segments can cause arcing between the two segments; overheating in the stator core 104, and reduced generator performance.

Furthermore, the keybar currents induced in each keybar 118 flow from the keybar 118 to a flange 204 coupled to the keybar. A mechanical joint by which a keybar 118 is coupled to a flange 204 can be a poor electrical conductor that provides a high resistance path for the current. As a result, the joint can be a source of undesirable energy dissipation and heat generation in power generator 100, and is also a potential source of arcing and pitting in the power generator. Furthermore, a flow of keybar current in a magnetically and electrically resistive flange 204 results in undesirable energy and heat dissipation in the flange. To avoid overheating the joint and the flange 204 and potential arcing and pitting, a power generator such as power generator 100 sometimes must be operated at backed off levels of magnetic flux and output voltage, reducing the efficiency and rated power level of the power generator 100.

Therefore, a need exists for a method and apparatus for reducing keybar currents and keybar voltage differentials induced in each of the multiple keybars.

BRIEF SUMMARY OF THE INVENTION

Thus there is a particular need for a method and apparatus that reduces keybar currents and that reduces any voltage differential that may appear between keybars. Briefly, in accordance with an embodiment of the present invention, a keybar shield is provided for insertion adjacent to an outer surface of a stator and that extends approximately an axial length of the stator. The keybar shield reduces the amount of flux coupling into a keybar during operation of a power generator, reducing a keybar voltage and a voltage differential that may appear between keybars. Also, by reducing the amount of flux coupling into a keybar, the keybar shield also reduces keybar currents and flange currents and their associated energy losses.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

Figure 1:
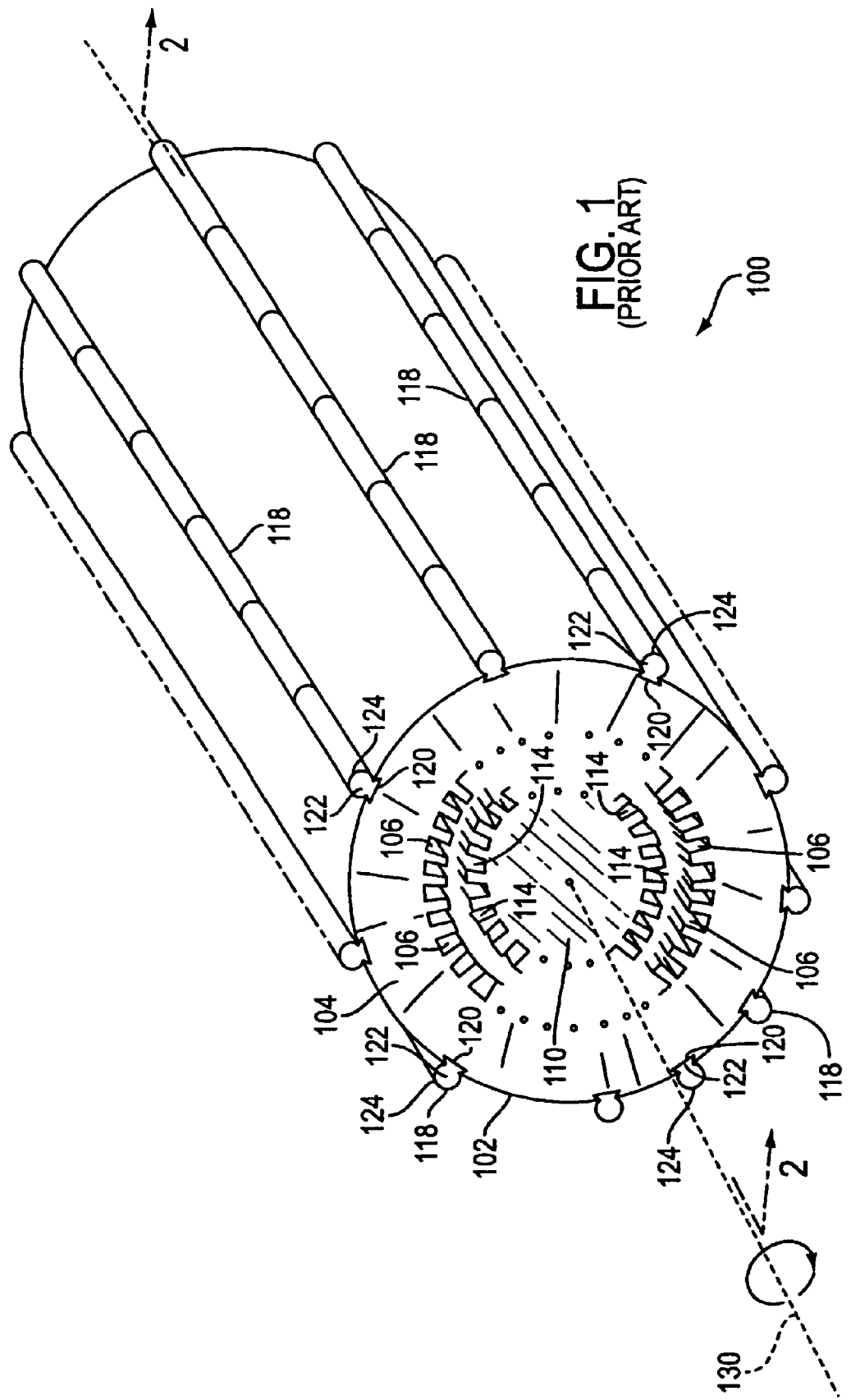
FIG. 1 is an isometric perspective of an end view of a cross-section of a power generator of the prior art.
Figure 2:
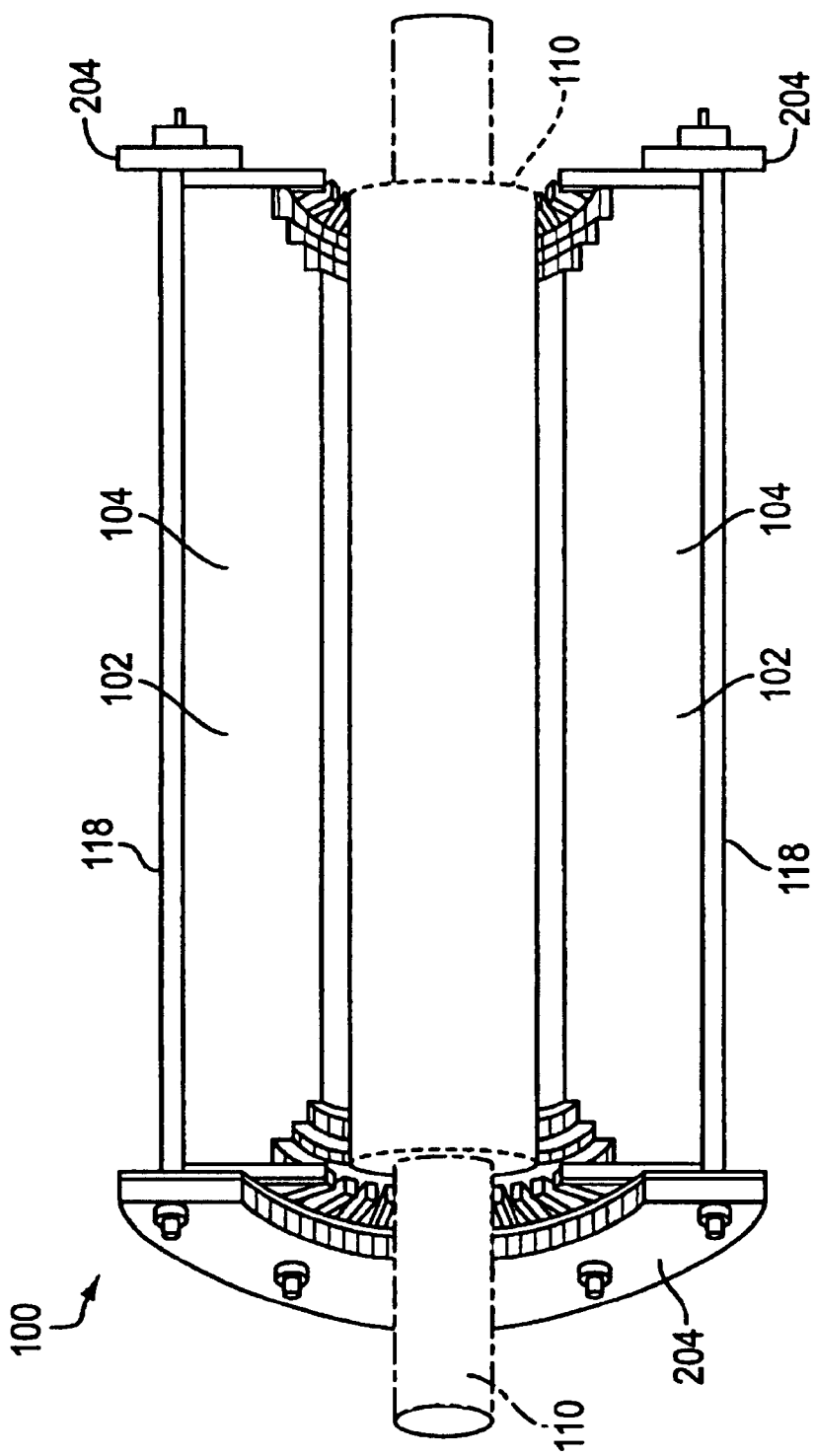
FIG. 2 is a cut-away view of the power generator of FIG. 1 along axis 2—2.
Figure 3:
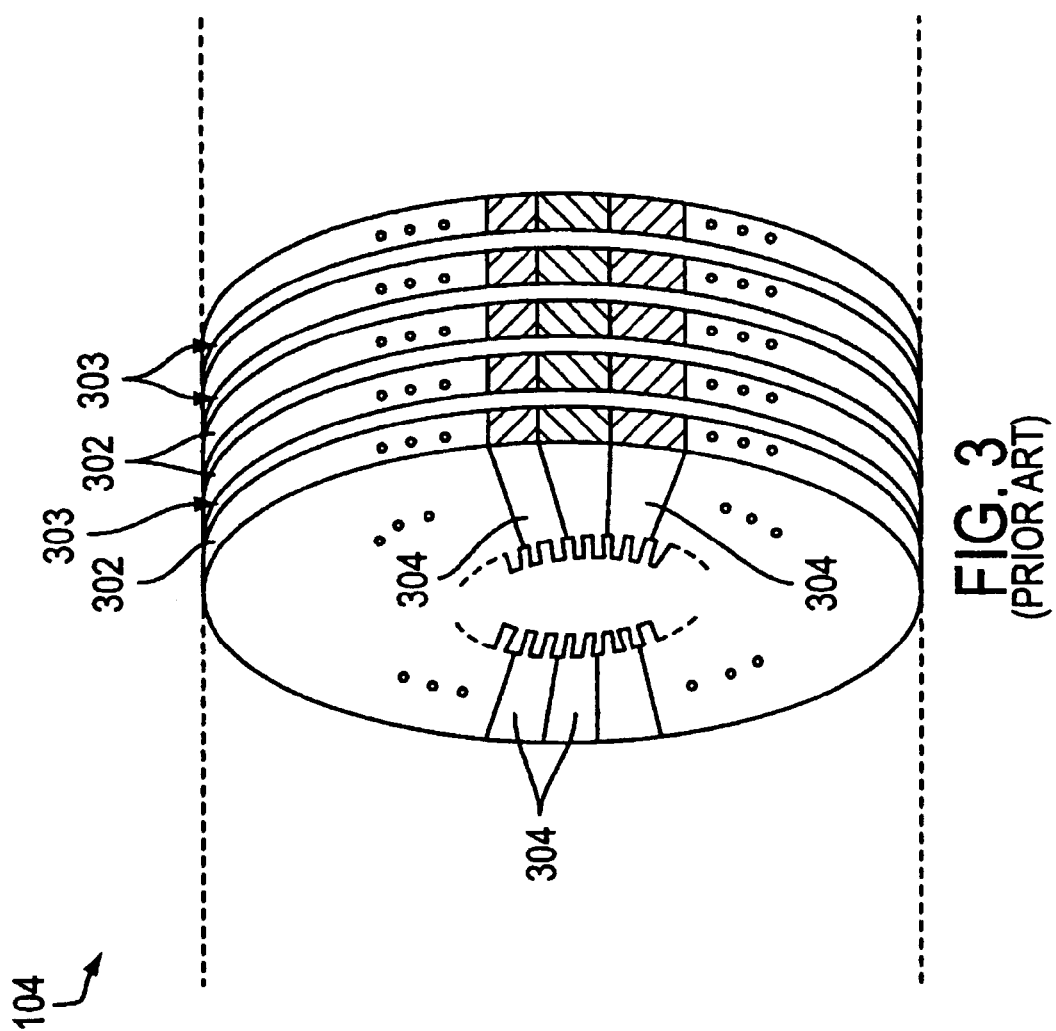
FIG. 3 is a partial perspective of the power generator of FIG. 1.
Figure 4:
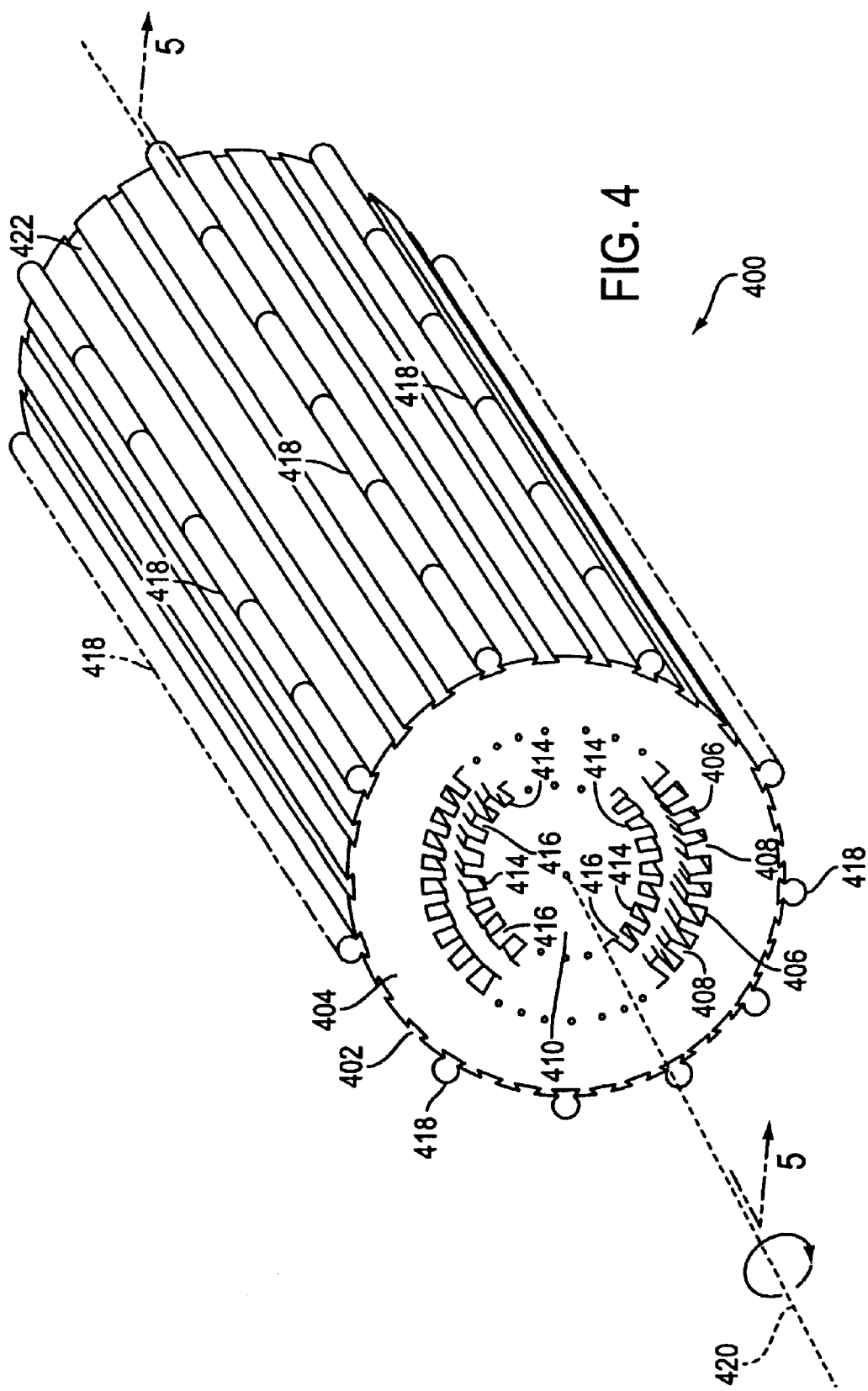
FIG. 4 is an end view of a cross-section of an exemplary power generator from an isometric perspective in accordance with an embodiment of the present invention.
Figure 5:
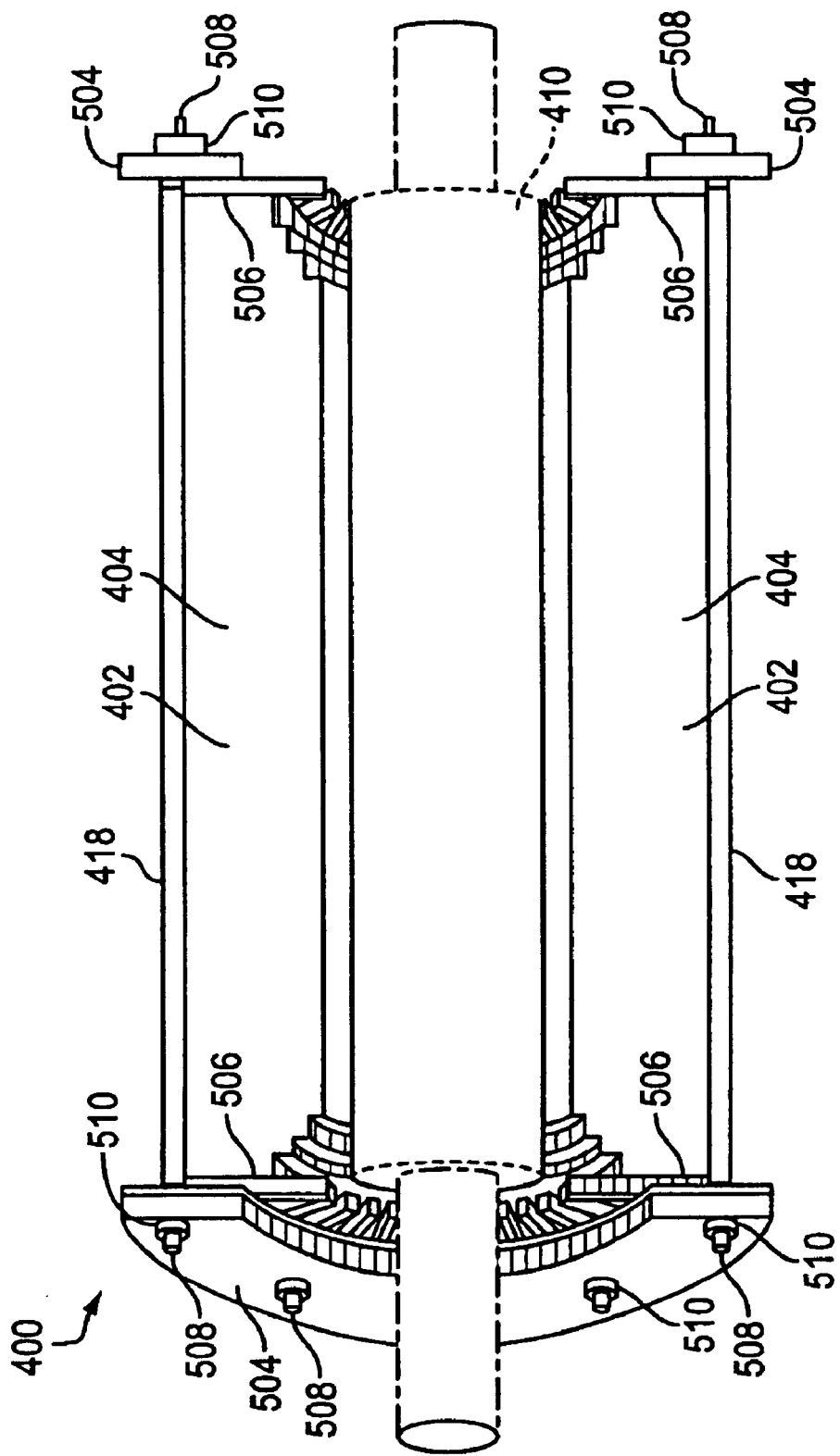
FIG. 5 is a cut-away view of the power generator of FIG. 4 along axis 5—5 in accordance with an embodiment of the present invention.

Referring now to FIGS. 4 and 5, an exemplary power generator 400 with reduced stator heating is illustrated. FIG. 4 is an end view of a cross-section of power generator 400 from an isometric perspective in accordance with an embodiment the present invention. FIG. 5 is a cut-away view of power generator 400 along axis 5—5 as shown in FIG. 4. As shown in FIGS. 4 and 5, power generator 400 includes a substantially cylindrical stator 402 having a stator core 404 and housing a substantially cylindrical rotor 410. The stator core 404 includes multiple circumferentially distributed and axially oriented dovetail slots 422. Keybars 418 are coupled together at each of a proximal end and a distal end by one of multiple flanges 504 (not shown in FIG. 4). Each keybar 418 is coupled to an outer surface of stator 402 and mates with a respective dovetail slot 422 for coupling to outer surface 402. The multiple keybars 418, together with the multiple flanges 504, form a keybar cage around the stator 402.

Similar to stator 102 of the prior art, an inner surface of stator 402 includes multiple stator slots 406 that are circumferentially distributed around the inner surface of the stator. Each stator slot 406 is axially oriented and extends approximately a full length of stator 402. Each stator slot 406 receives an electrically conductive stator winding (not shown). Between each pair of adjacent stator slots 406 is a stator tooth 408 that similarly is circumferentially distributed around the inner surface of stator 402 and extends approximately a full length of stator 402. Each stator tooth 408 is radially oriented and extends radially inward toward rotor 410 from stator 402.

Rotor 410 is rotatably disposed inside of stator 402. Similar to rotor 110 of the prior art, rotor 410 includes an outer surface that includes multiple rotor slots 414 that are circumferentially distributed around the outer surface of rotor 410. Each rotor slot 414 is radially oriented and extends approximately a full length of rotor 410. Between each pair of adjacent rotor slots 414 is a rotor tooth 416 that similarly is circumferentially distributed around the inner surface of rotor 410 and extends approximately a full length of rotor 410.

Each rotor tooth 416 is radially oriented and extends radially outward toward stator 402 from rotor 410. An air gap exists between stator 402 and rotor 410 that allows for a peripheral rotation of rotor 410 about axis 420.

Similar to generator 100 of the prior art, each slot of the multiple rotor slots 414 receives an electrically conductive rotor winding (not shown) and each slot of the multiple stator slots 406 of generator 400 receives an electrically conductive stator winding (not shown). Each rotor winding typically extends from a proximal end of rotor 410 to a distal end of the rotor in a first rotor slot of the multiple rotor slots 414, and then returns from the distal end to the proximal end in a second rotor slot of the multiple rotor slots 414, thereby forming a loop around a portion of the rotor. Each stator winding typically extends from a proximal end of stator 402 to a distal end of the stator in a first stator slot of the multiple stator slots 406, and then returns from the distal end of the stator to the proximal end of the stator in a second stator slot of the multiple stator slots 406, thereby forming a loop inside of the stator.

The multiple flanges 504 are each disposed adjacent to an end of stator core 404. Disposed between each flange 504 and stator core 404 are outside space blocks 506. Each outside space block 506 is a generally rectangular bar coupled to a respective one of flanges 504 and sandwiched between the respective flange 504 and an axial end of stator core 404. Multiple outside space blocks 506 are radially oriented along each axial end of stator core 404 in a spoke-like configuration. In such a configuration, outside space blocks 506 form gaps between stator core 404 and flanges 504, which allow ventilation at the ends of stator 402.

Each of the multiple flanges 504 is a ring-shaped metallic material that includes multiple keybar stud apertures (not shown) for receiving a keybar stud 508. The apertures are circumferentially disposed around each flange 504 in positions that correspond to positions of keybars 418 around stator 402. Each end of each keybar 418 includes a threaded keybar stud 508 that extends axially outward from the end of the keybar. Each flange 504 is placed on an end of stator 402 and over the keybar studs 508 such that each stud extends through the flange via a corresponding keybar stud aperture. Each flange 504 is then fastened onto an end of stator 402 and the multiple keybars 418 by multiple threaded nuts 510 that are each screwed onto a correspondingly threaded keybar stud 508.

Figure 6:
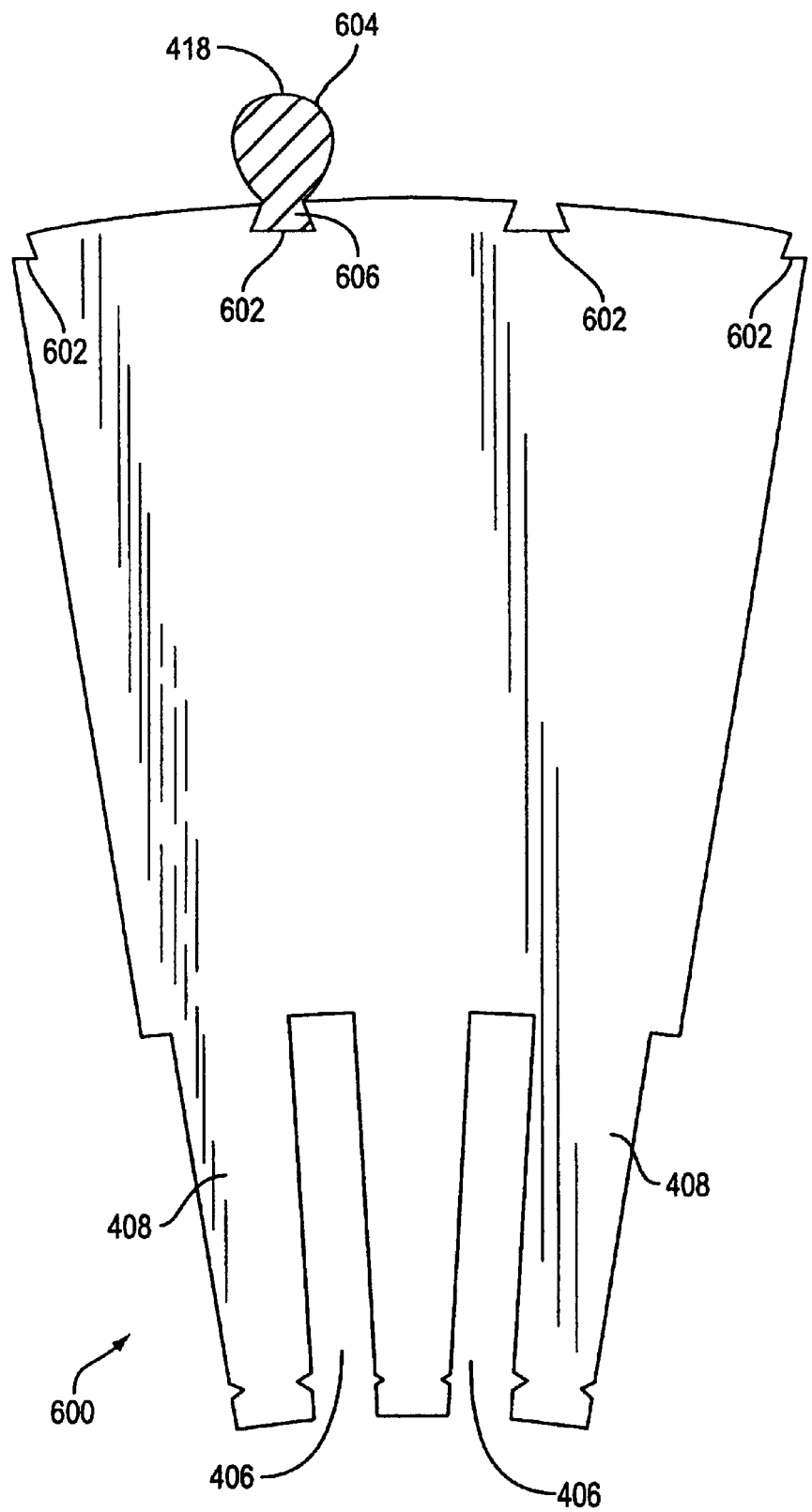
FIG. 6 is a top view of an exemplary lamination segment in accordance with an embodiment of the present invention.

Stator core 404 preferably includes multiple, stacked ring-shaped laminations, similar to stator core 104 of the prior art. Preferably, each ring-shaped lamination is subdivided into multiple lamination segments. FIG. 6 is an illustration of an exemplary lamination segment 600 in accordance with an embodiment of the present invention. As shown in FIG. 6, each lamination segment 600 of the multiple lamination segments includes multiple dovetail-shaped slots 602 in an outer edge of the segment for mechanically coupling the lamination segment to one or more keybars 418. In turn, each keybar 418 includes an outer side 604 and an inner, locking side 606. Locking side 606 includes a dovetail-shaped ridge that extends a length of the keybar 418 and that is designed to mate with a dovetail-shaped slot 602 of a lamination segment 600, thereby coupling each lamination segment 600 to a keybar 418. Multiple flanges 504 then hold the multiple keybars 418 and, in association with the keybars, the multiple ring-shaped laminations and the associated lamination segments in position in stator core 404.

Figure 7:
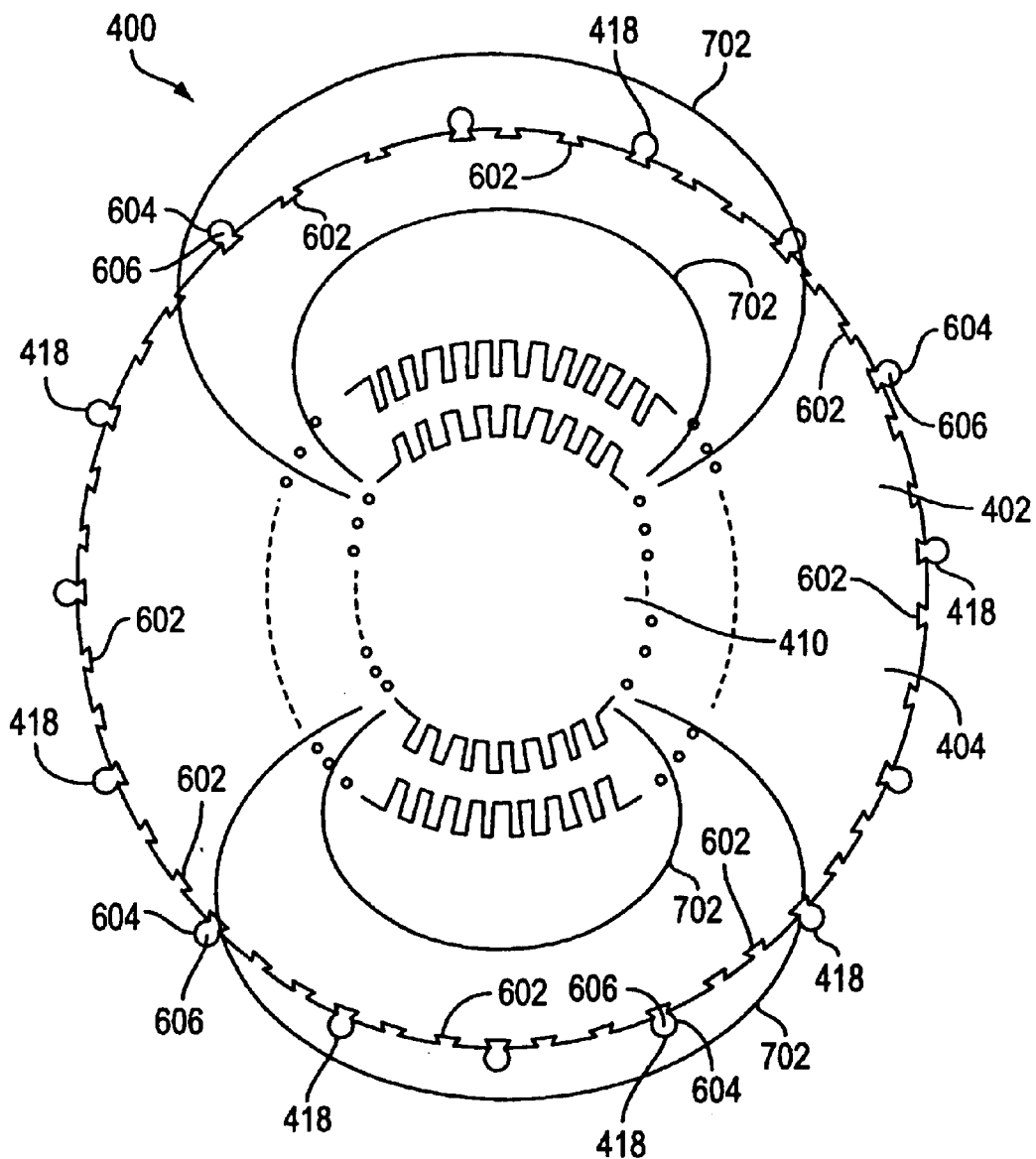
FIG. 7 is an end view of a cross section of the power generator of FIG. 4 in accordance with an embodiment of the present invention

FIG. 7 is an end view of a cross-section of generator 400. As shown in FIG. 7, a rotation of rotor 410 inside of stator 402 when a DC current is flowing in the multiple windings of rotor 410 induces magnetic fields in, and a passage of magnetic flux 702 through, stator 402. A portion of the magnetic flux passes completely through stator 402 and spills outside of the outer surface of stator 402, coupling into each of the multiple keybars 418. The coupling of magnetic flux into each of multiple keybars 418 can induce keybar voltages and keybar currents in the keybar and a voltage differential between keybar voltages induced in each of two different keybars 418. In addition, keybar currents induced in each keybar 118 flow from the keybar 418 to a flange 504 coupled to the keybar via a potentially high resistance mechanical joint. In order to minimize undesirable effects of keybar voltage differentials, keybar currents, and flange currents, power generator 400 includes a keybar voltage and current reduction apparatus that reduces keybar voltages and keybar currents induced in a keybar 418 by a rotation of rotor 410.

Figure 8:
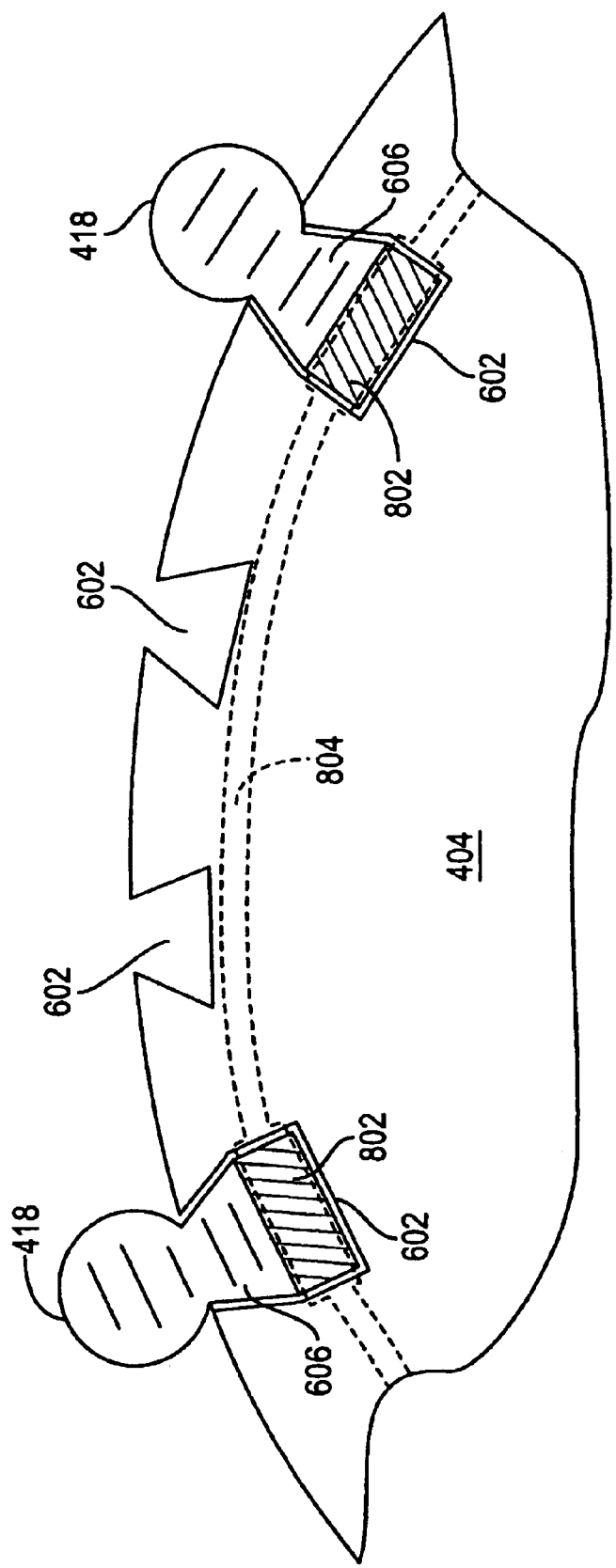
FIG. 8 is a partial end view of a cross section of the power generator of FIG. 4 in accordance with an embodiment of the present invention.
Figure 9:
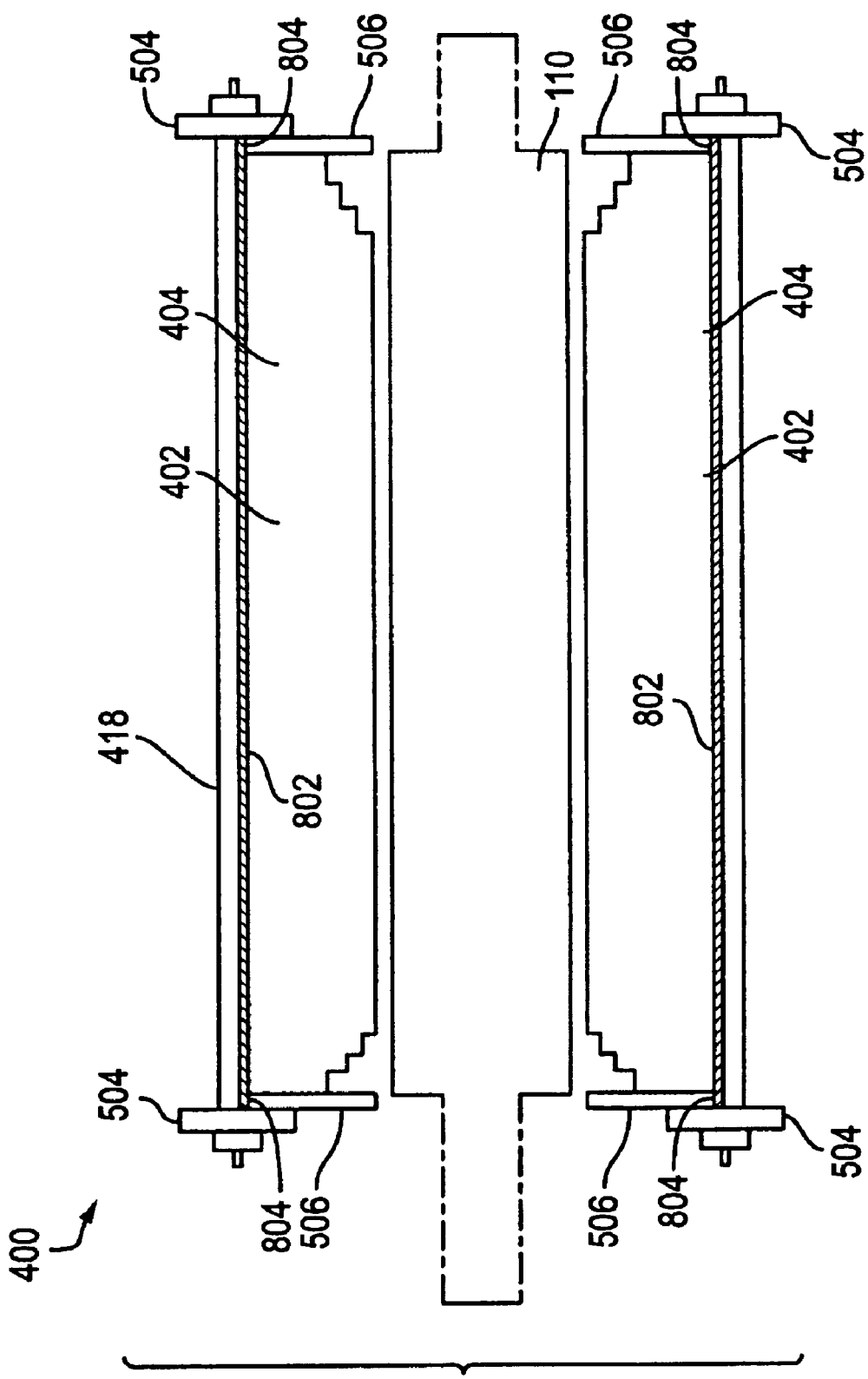
FIG. 9 is a side view of a cross section of the power generator of FIG. 4 in accordance with an embodiment of the present invention.

Referring to FIGS. 8 and 9, a keybar voltage and current reduction apparatus is illustrated in accordance with an embodiment of the present invention. FIG. 8 is a partial end view of a cross section of a power generator 400 in accordance with an embodiment of the present invention. FIG. 9 is a side view of a cross section of a power generator 400 in accordance with an embodiment of the present invention. As shown in FIGS. 8 and 9, power generator 400 further includes multiple highly electrically conductive keybar shields 802 that are each coupled to at least one of multiple keybar shunts 804, thus forming a keybar shield cage. Each keybar shield of the multiple keybar shields 802 is an electrical conductor of a low electrical resistance, such as a strip of copper, a bar of copper, or a copper braid. Those who are of ordinary skill in the art realize that other materials of low electrical resistance may be used herein without departing form the spirit and scope of the present invention.

Each keybar shield 802 is axially oriented and is disposed between a locking side 606 of a keybar and a slot 602 of stator core 404. In addition, a preferable length of each keybar shield 802 is approximately a entire axial length of stator core 404; however, those who are of ordinary skill in the art realize that keybar shields of other lengths may be used herein, or that a keybar shield may be divided into multiple discrete segments that are each less than a full length of the stator core, without departing from the spirit and scope of the present invention.

In power generator 400, magnetic flux generated by rotor and stator windings that spills outside of stator 402 couples to one or more keybar shields 802, which produces electric currents in keybar shields 802. Because these currents are produced by the spilled magnetic flux, they create their own secondary magnetic flux that is substantially opposite in direction to the spilled magnetic flux. Thus, de-magnetizing secondary flux created from induced keybar shield currents reduces the amount of magnetic flux that couples to a keybar 418, and thereby reduces voltages and currents induced in the keybar by the flux. By reducing potential keybar voltage differentials, the keybar shields 802 reduce the possibility of arcing and localized heating in stator 402.

Each keybar shield 802 is electrically coupled to the other keybar shields 802 at each of a proximal end and a distal end of the keybar shield by one of the multiple keybar shunts 804. In one embodiment, each keybar shunt 804 is an electrically conductive ring that is affixed to an end of each keybar shield 802. For example, a keybar shield 802 may be brazed to keybar shunt 804. By way of another example, each keybar shield 802 may further include a threaded keybar shield stud that extends axially outward from the end of the shield. Each keybar shunt 804 may then include multiple apertures that are each aligned with a keybar shield stud and that facilitate a bolting of each keybar shield 804 to the keybar shunt 804. Alternatively, each keybar shunt 804 may be any kind of electrically conductive link between the multiple keybar shields 802. Further, each keybar shunt 804 may be a flexible electrically conductive link. As a flexible link, keybar shunts 804 are better able to withstand operating stresses without significantly affecting a resonant frequency of power generator 400 during operation. As shown in FIG. 9, each keybar shunt 804 can be disposed between each of the keybars 418 and an outside space block 506 and adjacent to a flange 540. In alternative embodiments of the present invention, each keybar shunt 804 may be disposed between a space block 506 and stator core 404 or between the space block and a flange 506.

Figure 10:
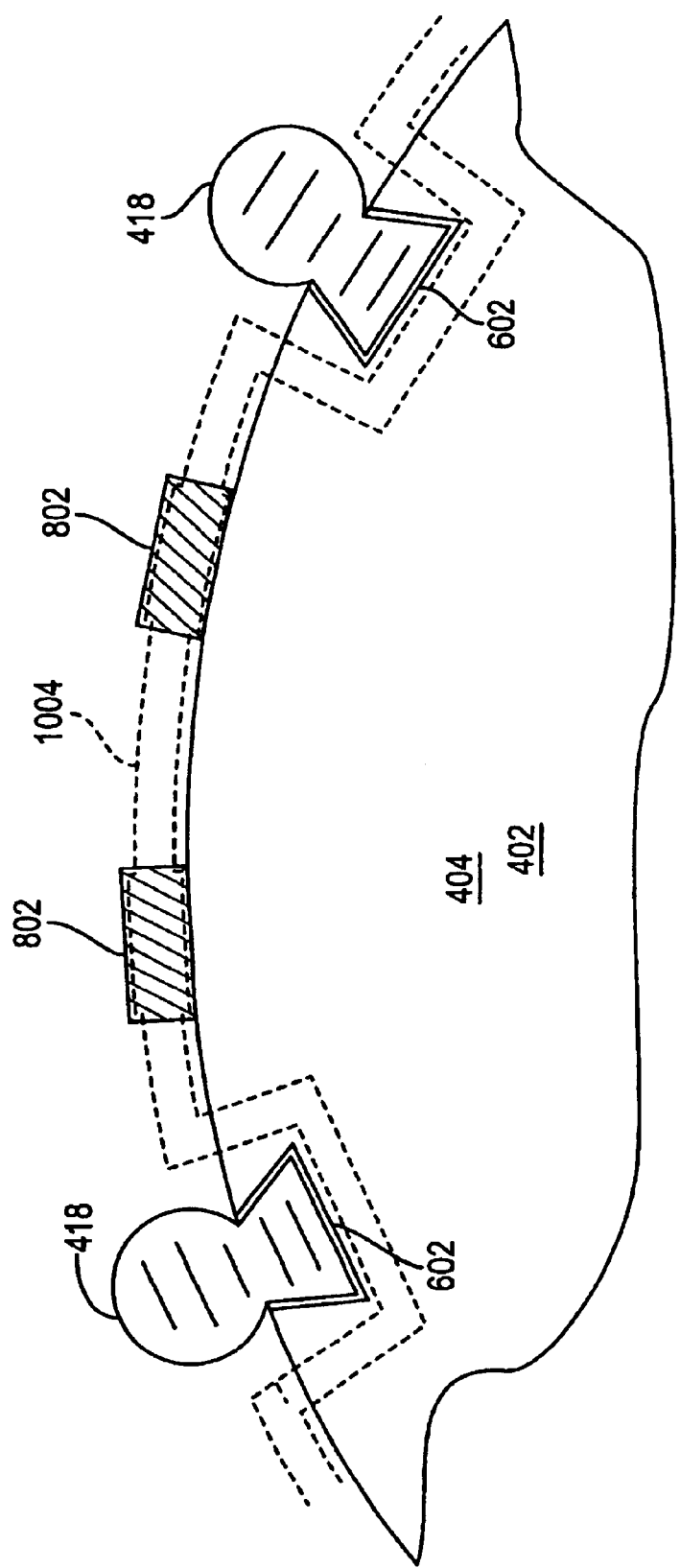
FIG. 10 is a partial end view of a cross section of a power generator in accordance with another embodiment of the present invention.

Referring now to FIG. 10, a keybar voltage and current reduction apparatus is illustrated in accordance with another embodiment of the present invention. As shown in FIG. 10, instead of being disposed in a stator slot 602, each keybar shield 802 may be disposed on an outer surface of the stator 402 outside of the slots. Similar to the keybar reduction apparatus of FIGS. 8 and 9, each keybar shield 802 is shorted at each of a proximal end and a distal end of the keybar shield by being electrically coupled to one of multiple keybar shunts 1004. Similar to multiple keybar shunts 804, each keybar shunt of the multiple keybar shunts 1004 may be approximately ring-shaped and includes a low resistance material in order to provide a low resistance electrical connection among each of the multiple keybar shields 802. Further, like multiple keybar shunts 804, each keybar shunt 1004 may be a flexible electrically conductive link.

The multiple keybar shields 802, in conjunction with the multiple keybar shunts 1004, may form a keybar shield cage that is parallel to the keybar cage. In addition, each keybar shield may be affixed to the outer surface of stator 402, for example by a high temperature adhesive or by a mechanical fastener. The width of keybar shield 802 may vary with the designer of power generator 400, and in yet another embodiment of the present invention, a keybar shield may be of a width that spans most of the distance along the outer surface of stator 402 between adjacent keybars 418. Preferably, a wider keybar shield 1002, such as the keybar shield that spans most the distance along the outer surface of stator 402 between adjacent keybars 418, will further include multiple apertures that permit a gaseous flow through the keybar shield, facilitating a temperature regulation of stator 402.

Figure 11:
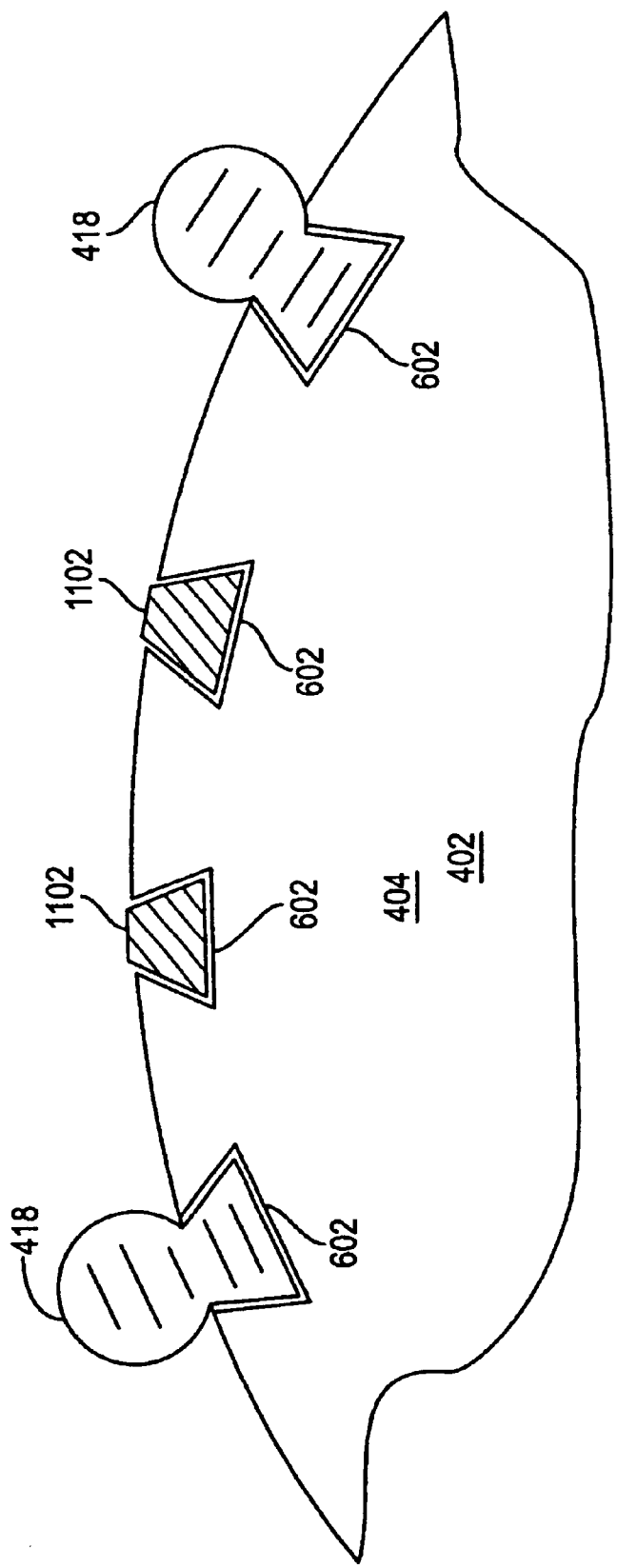
FIG. 11 is a partial end view of a cross section of a power generator in accordance with another embodiment of the present invention.

Referring now to FIG. 11, a keybar voltage and current reduction apparatus is illustrated in accordance with still another embodiment of the present invention. As shown in FIG. 11, each keybar shield 1102 of multiple keybar shields may be of a shape, preferably a dovetail shape, that mates with a shape of a slot 602 of stator 402. Each keybar shield 1102 is then disposed in one of the slots 602 of stator 402 that is not used by one of the multiple keybars 418. Similar to keybar shield 802, each keybar shield 1102 is an electrical conductor of a low electrical resistance, such as a bar of copper or a copper braid. Further each keybar shield 1102 preferably extends approximately an entire axial length of stator core 404 without extending beyond the ends of stator core 404 or attaching to end flanges 504. In addition, and similar to the multiple keybar shields 802, each keybar shield 1102 is shorted at each of a proximal end and a distal end of the keybar shield by being electrically coupled to one of multiple keybar shunts, such as keybar shunt 1004.

By including multiple keybar shields that are each disposed adjacent to an outer surface of a power generator stator and that each extends approximately an entire axial length of the stator, the keybar voltage and current reduction apparatus reduces keybar voltages and currents, a keybar voltage differential, and an operating temperature of the power generator. Magnetic flux generated by a rotation of a power generator rotor is coupled to the keybar shields, reducing the amount of magnetic flux coupled to each of multiple keybars. By reducing the amount of flux coupled to each keybar, the keybar shield reduces keybar voltages and currents induced by the flux, thereby reducing potential voltage differentials between the keybar voltages and reducing the possibility of arcing and localized heating in the stator. Furthermore, by reducing the amount of flux coupled to each keybar, the keybar shield reduces the flow of keybar currents from the multiple keybars to a flange thereby reducing flange currents. By reducing keybar currents and flange currents, the keybar voltage and current reduction apparatus reduces heat and energy dissipation in the keybars, the flange, and the mechanical joints coupling the keybars to the flange.

The keybar shields, such as keybar shields 1102 shown in FIG. 11, are preferably mechanically isolated from all but stator core 404 to decrease the possibility of affecting a resonant frequency of power generator 400. During operation of power generator 400, rotation of rotor 410 inside of stator 402 causes vibrations throughout power generator 400. If some of these vibrations match harmonics of a resonant frequency of generator 400 or a resonant frequency of components of generator 400, harmful vibration effects may result. The frequencies of vibrations created in generator 400 during operation depend on numerous factors, such as the speed at which rotor 410 spins or the freedom of movement between generator components.

Likewise, resonant frequencies of the generator and/or components depend on numerous factors. For example, the generator design, the type and orientation of generator mounts, and the freedom of movement between generator components affect resonant frequencies. Further, the mass and stiffness of various components, as well as their material properties, affect resonant frequencies. Additionally, attributes such as size, shape, and geometry of components affect their resonant frequencies and the resonant frequency of the system. When vibrations created during operation match harmonics of one or more resonant frequencies, harmful vibration effects may occur, such as operational instability, increased wear, and accelerated fatigue of components.

To reduce negative vibration effects, generator 400 may be tuned for operation at desired rotor speeds and in desired modes. For example, rotor 410 may be balanced to reduce the creation of vibrations or shock absorbers may be added to dampen undesirable vibrations. The addition of a keybar voltage and current apparatus to a tuned generator may change the resonant frequency of the generator or its components. For example, adding keybar shields 802 and keybar shunts 1004 shown in FIG. 10 to a tuned generator 400 may change the resonant frequency of generator 400 or of its components, such as stator core 404. Accordingly, it may be important to reduce their vibration effects on the generator system.

Mechanical isolation of keybar shields 802 from components other than stator core 404 will reduce such vibration effects. This may be accomplished by using stator-length keybar shields 802, which do not extend beyond the distal and proximate ends of stator core 404 and do not connect to end flanges 504. In such a configuration, keybar shields 802 are only connected to stator core 404, and thereby do not limit the movement of the stator core 404 with respect to other components of generator 400. Consequently, potential vibration effects to generator 400 from the addition of keybar shields 802 and shunts 1004 are reduced.

Using flexible, rather than rigid, keybar shunts 1004 for interconnecting keybar shields 802 will further diminish vibration effects. This is because flexible keybar shunts 1004 have negligible effects on the freedom of movement of the respective keybar shields 802 and/or keybars 418 to which they are attached. Also, because some of lamination segments 600 are connected to keybar shields 802, flexible shunts 1004 between keybar shields 802 also have negligible effects on the freedom of movement of attached lamination segments 600 and their corresponding ring-shaped laminations. By reducing the effect on the freedom of movement of generator components, the potential for creating negative vibration effects is significantly reduced with the use of flexible shunts.

Further, the use of flexible shunts, such as shunts 1004 shown in FIG. 10, provides a generally more robust design that is able to respond to operating stresses and vibrations without greatly stressing connections to shunts 1004. Flexible shunts 1004 are able to contract and expand as necessary to adapt to movement of attached keybar shields 802 and/or keybars 418. Because of this adaptability, movement and vibrations during operation are generally not transmitted to the mechanical connections between shunts 1004 and keybar shields 802, or in alternative configurations, to the mechanical connections between shunts 1004 and keybars 418. Accordingly, these connections are less susceptible to fatigue and are more durable than connections to rigid shunts.

The keybar shields 802, 1102 and shunts 1004 shown in FIGS. 10 and 11 constitute a keybar voltage and current reduction apparatus kit that may retrofit an existing system with little modification. For instance, as shown in FIG. 11, keybar shields 1102 take advantage of existing dovetail-shaped slots 602 for connecting to stator core 404 without requiring connection to flanges 504. Further, as shown in FIG. 10, keybar shunts 1004 may be mechanically and electrically connected to keybar shields 802 using techniques that are relatively simple and well known. As an example, keybar shunts 1004 may be brazed to keybar shields 802 from the exterior of stator 402 after the keybar shields 802 are connected to stator core 404.

Figure 12:
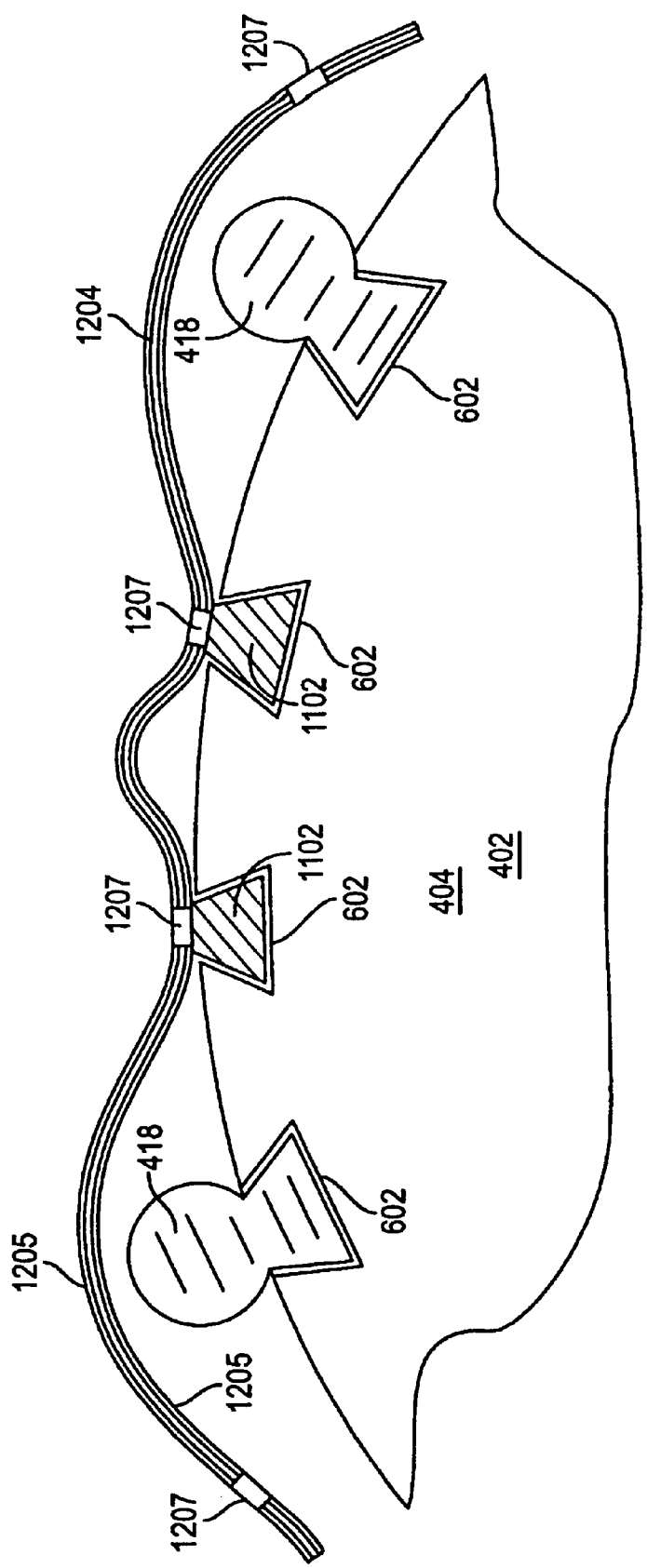
FIG. 12 is a partial end view of a cross section of a power generator in accordance with a further embodiment of the present invention.

Referring now to FIGS. 12–15, several keybar voltage and current reduction apparatus, which are relatively easy to install and have negligible vibration effects on power generator 400, are illustrated in accordance with further embodiments of the present invention. These embodiments are generally the same as the embodiment of FIGS. 10 and 11, except for aspects and preferences related to keybar shunts and their connection to keybar shields and/or keybars. FIG. 12 shows a keybar shunt 1204 coupled to each keybar shield 1102. The keybar shunt 1204 is coupled to keybar shields 1102 via mechanical connections, such as brazed, bolted or press-fit connections; however, the keybar shunts 1204 themselves are flexible.

Keybar shunt 1204 includes multiple electrically conductive strips 1205 banded together at certain locations using bands 1207. Some of the bands 1207 are attached to keybar shields 1102. The conductive strips 1205 are preferably made of copper or another highly conductive metal. Optionally, keybar shunts 1204 may be connected to both keybars 418 and keybar shields 1102, or may be connected to selected ones of keybars 418 and keybar shunts 1204. To provide reinforcement to shunt 1204 and help maintain a desired shape, some of strips 1205 may be made of steel. Thus, shunt 1204 may have increased structural strength as provided by steel strips and high conductivity as provided by copper strips. Shunt 1204 may be reinforced in other ways, such as by guides (not shown) or other structural members that do not interfere with the flexibility of shunt 1204.

To provide an efficient connection with keybar shields 1102, shunt 1204 may further be made from multi-contact strips or may use multi-contact connectors for coupling with keybar shields 1102. Multi-contact strips and multi-contact connectors as used herein are electrical strips or connectors that include multiple outwardly biased projections for making contact with a corresponding surface, such as a surface on a keybar shield. Multiple contact points between the corresponding surface via the projections provides good electrical contact with low contact resistance. As an example, shunt 1204 may include a multi-contact strip known in the art as a MULTILAM strip, which can be press-fit into a slot (not shown) of keybar shield 1102. In another example, shunt 1204 may include a multi-contact connector (not shown) that is press-fit into a slot (not shown) of keybar shield 1102.

Figure 13:
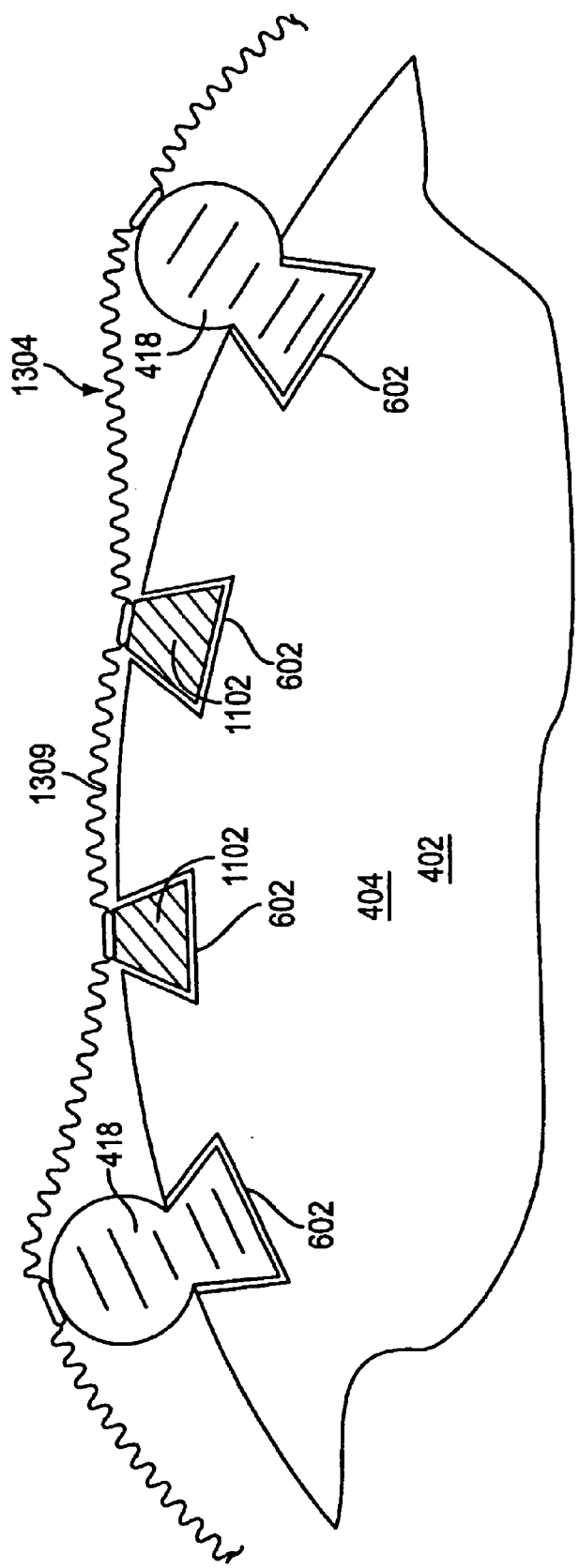
FIG. 13 is a partial end view of a cross section of a power generator in accordance with an additional embodiment of the present invention.

FIG. 13 shows a keybar shunt 1304 coupled to keybar shields 1102 and keybars 418. The keybar shunt 1304 includes an electrically conductive corrugated strip. Corrugated strip 1304 may expand and contract in accordance with corrugations 1309 formed in the strip. Corrugated strip 1304 is preferably made of copper or another highly conductive metal. As shown, keybar shunts 1304 may be connected to both keybar shields 1102 and keybars 418; however, keybar shunts 1304 may be connected to any number of keybars 418 and/or keybar shields 1004 as desired. Corrugated strip 1304 may be reinforced with a high strength strip (not shown) to add strength and shape to the overall structure.

Figure 14:
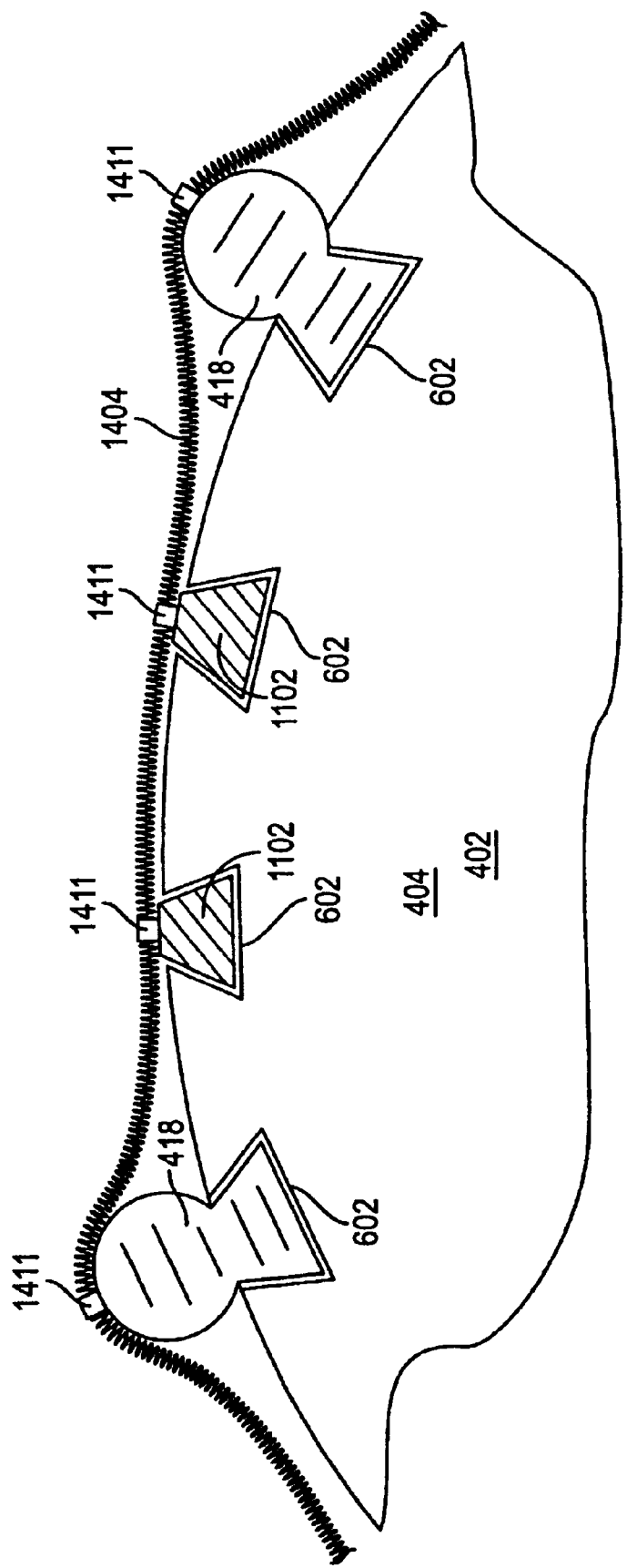
FIG. 14 is a partial end view of a cross section of a power generator in accordance with yet another embodiment of the present invention.

FIG. 14 shows a keybar shunt 1404 coupled to keybar shields 1102 and keybars 418. The keybar shunt 1404 includes an electrically conductive cylindrical helical spring 1404. Helical spring 1404 expands and contracts as necessary in accordance with its coils. Helical spring 1404 may be made of copper or another highly conductive metal. As shown in FIG. 14, bands 1411 placed around spring 1404 may be used to mechanically attach spring 1404 to keybar shields 1004 (and optionally keybars 418) by brazing bands 1411 to shields 1004. Helical spring 1404 may be reinforced by a high strength structural member (not shown) if desired. For example, a steel helical spring (not shown) may be coaxially threaded through the center of spring 1404 to provide strength to keybar shunt 1404.

Figure 15:
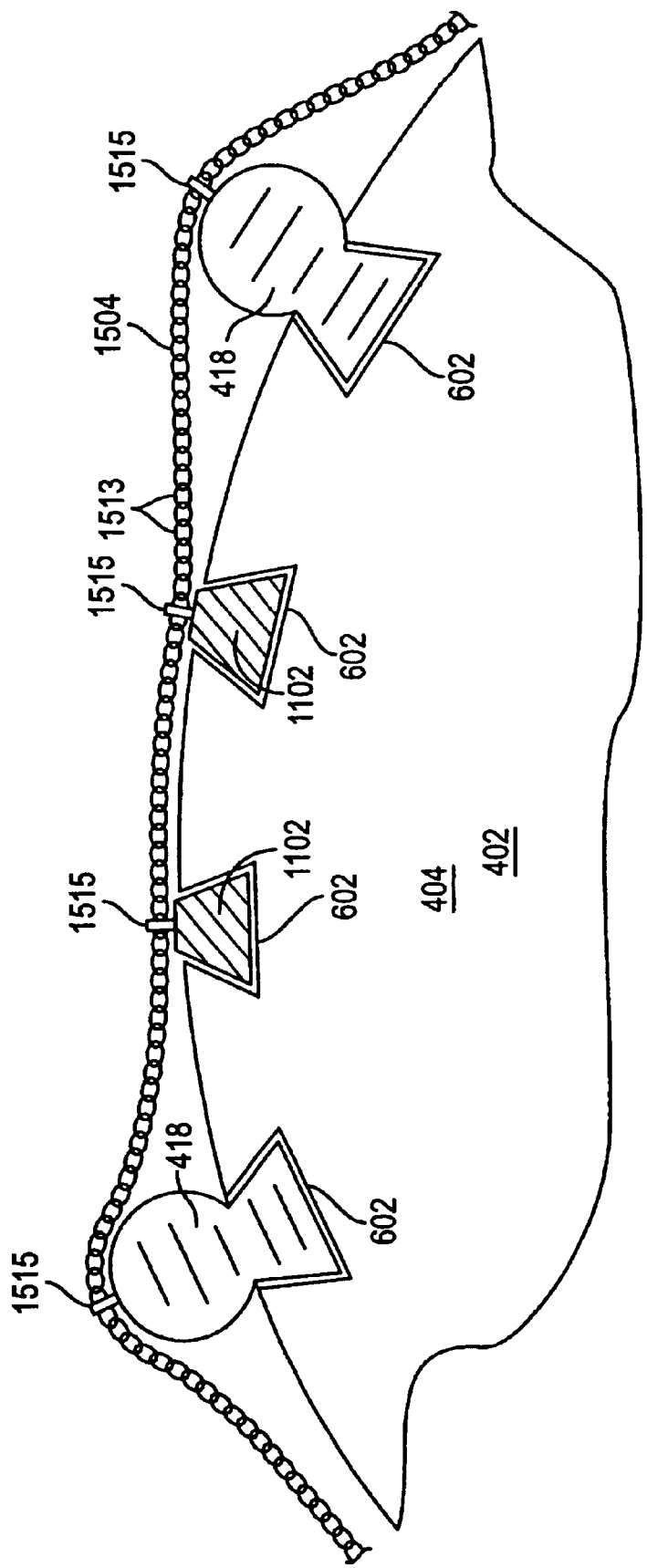
FIG. 15 is a partial end view of a cross section of a power generator in accordance with a further embodiment of the present invention.

FIG. 15 shows a keybar shunt 1504 coupled to keybar shields 1102 and keybars 418. The keybar shunt 1504 includes an electrically conductive chain 1504. Chain 1504 includes interconnected links 1513 made of copper or another highly conductive metal. Chain 1504 includes rings 1515 that are attached to keybars 418 and keybar shields 1102 via brazing or other connection means. As shown, chain 1504 is preferably attached in a slightly relaxed state to permit expansion and contraction as necessary to respond to stresses and vibrations during operation of generator 400. Shunt 1504 may be reinforced with a high strength structural member, such as steel cable threaded through chain 1504, to add strength to the structure.

Figure 16:
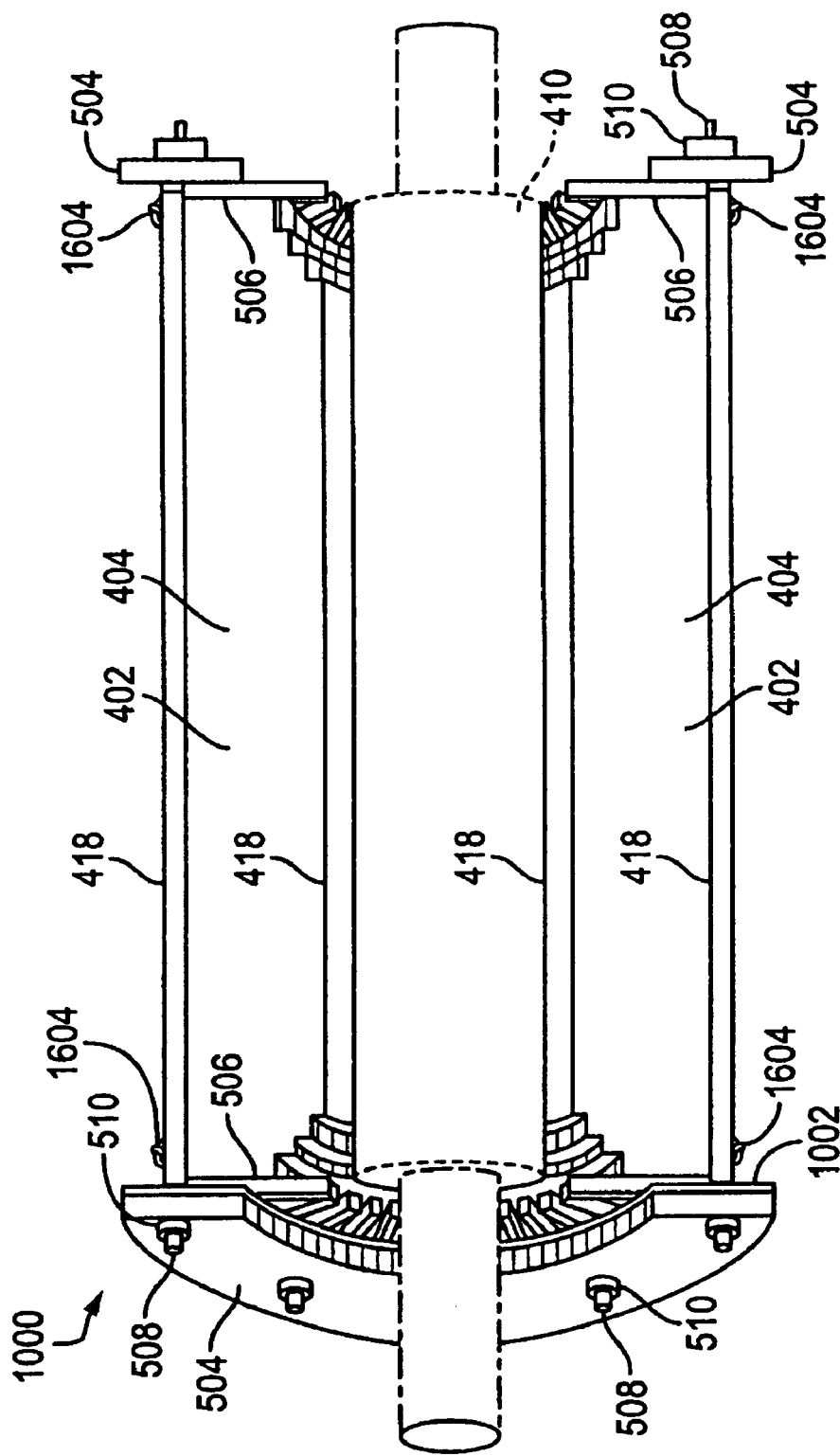
FIG. 16 is a side view of a cross section of a power generator in accordance with an embodiment of the present invention.
Figure 17:
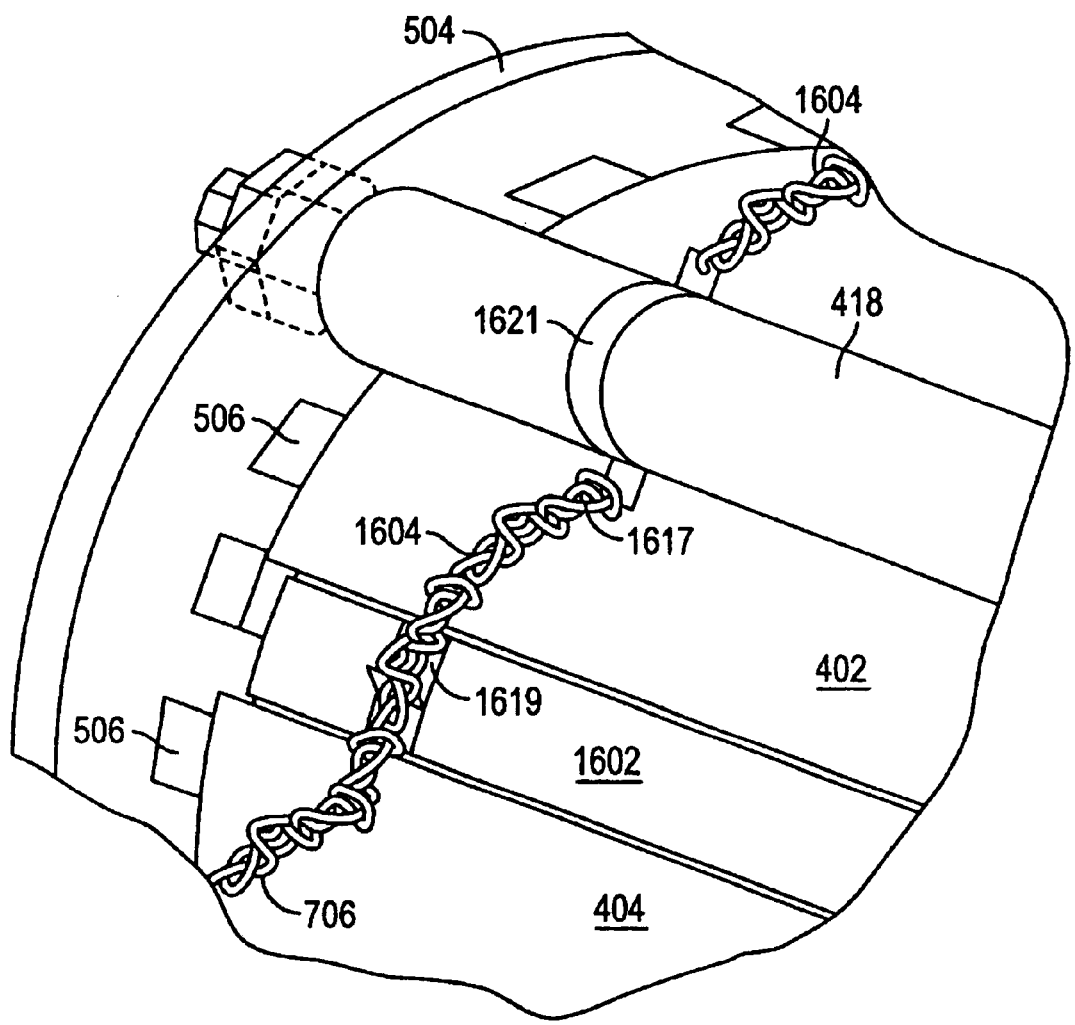
FIG. 17 a perspective view of an end portion of the power generator of FIG. 16.

FIGS. 16 and 17 show a keybar shunt 1604 coupled to keybar shields 1102 and keybars 418. The keybar shunt 1604 includes an electrically conductive braid 1604. Braid 1604 is made of interwoven wire strands 1617 made of copper or another highly conductive metal. In other embodiments, braid 1604 may include a highly conductive fabric, such as a metal fabric made of copper. Braid 1604 may also include strands of high strength materials, such as steel, to reinforce the shunt. Braid 1604 is attached to straps 1621 that are attached to keybars 418, and straps 1619 that are attached to keybar shields 1102, via brazing or other connection means. Straps 1619, 1621 are made from a highly conductive material, such as copper or another metal, that aid attachment of braid 1604 to keybars 418 and keybar shields 1102 respectively. As shown, braid 1604 is preferably attached in a slightly relaxed state such that strands 1617 are loosely connected to each other and segments of braid 1604 between straps 1619, 1621 are able to hang slightly. As such, braid 1604 may expand and contract as necessary to respond to stresses and vibrations during operation of generator 400.

As shown in FIGS. 16 and 17, keybar shunts 1604 are preferably connected to keybar shields 1102 and keybars 418 at their proximal and distal ends at a position inboard of the stator ends. By placing keybar shunts 1604 inboard of the stator ends, keybar shunts 1604 do not inhibit the flow of gases between space blocks 506. Further, keybar shields 1602 preferably do not extend beyond the proximal and distal ends of stator 402. As such, keybar shields 1602 also do not inhibit the flow of gases between space blocks 506. It is recognized, however, that keybar shunts 1604 may be placed anywhere along the length of generator 400 as desired.

Figure 18:
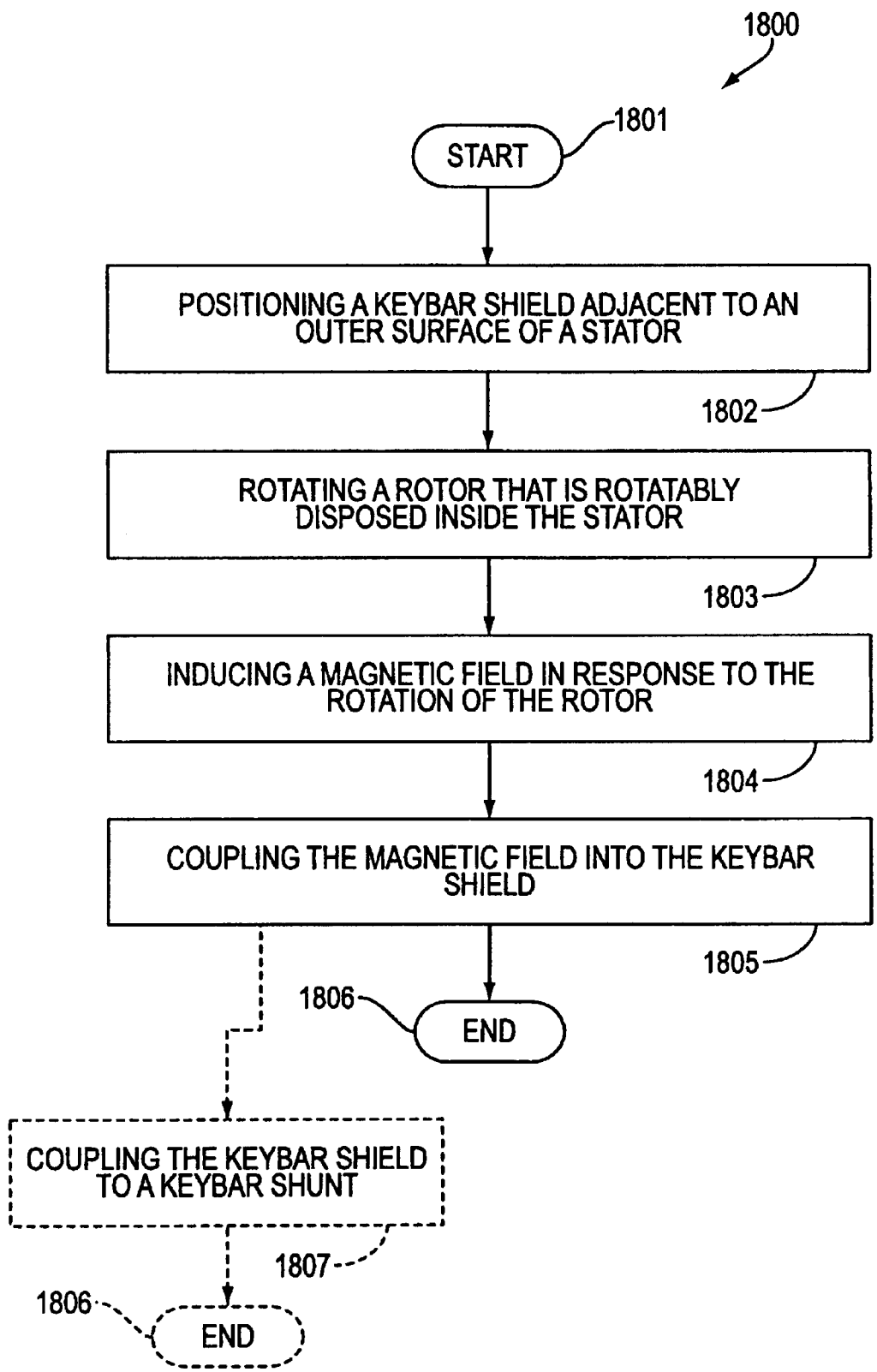
FIG. 18 is a logic flow diagram of steps executed in order to reduce keybar voltages and currents, flange currents, and keybar voltage differentials in a power generator in accordance with an embodiment of the present invention.

FIG. 18 is a logic flow diagram 1800 of a method for reducing keybar voltages and currents, flange currents, and keybar voltage differentials in a power generator in accordance with an embodiment of the present invention.

Preferably, the power generator comprises an approximately cylindrical stator having an outer surface, a proximal end, a distal end, and a stator core. The power generator further comprises multiple keybars axially disposed adjacent to the outer surface of the stator and a rotor rotatably disposed inside of the stator. The logic flow diagram begins (1801) when a keybar shield is positioned (1802) adjacent to the outer surface of the stator. A rotating (1803) of the rotor induces (1804) a magnetic field, which magnetic field is coupled (1805) into the keybar shield and the logic flow ends (1806). By providing for a coupling of the magnetic field into the keybar shield, the keybar shield reduces the magnetic field coupled into a keybar, thereby reducing voltages and currents induced in the multiple keybars by the magnetic field and reducing a flow of keybar currents into the flanges. In addition, by reducing keybar voltages, potential keybar voltage differentials are reduced as well. In an embodiment of the present invention, the method may further include a step of coupling (1807) the keybar shield to a keybar shunt.

In sum, a power generator is provided that includes multiple keybar shields, which keybar shields reduce the amount of flux coupling into each of multiple keybars during operation of a power generator. By reducing the amount of flux coupling into the keybars, the keybar shields permit the power generator to operate at a reduced temperature level, or alternatively to be driven harder in order to operate at the same temperature level. That is, by reducing the amount of flux coupling into the multiple keybars, the keybar shield reduces levels of keybar voltages and keybar currents induced by the flux and also reduces a potential voltage differential between voltages induced by the flux in each of the multiple keybars.

While the present invention has been particularly shown and described with reference to particular embodiments thereof, it will be understood by those skilled in the art that various changes may be made and equivalents substituted for elements thereof without departing from the spirit and scope of the invention. For example, keybar shunts may be made from a copper alloy (e.g. beryllium copper, brass, bronze, nickel silver) or other high conductivity materials (e.g. nickel-Beryllium), and may be plated with a highly conductive material (e.g. electroplated with gold or nickel). In another example, keybar shunts may be made from a variety of designs and configurations, such as a design that includes a copper wire having slack between connections to provide flexibility, or designs including electrical multi-contact elements, such as electrical elements known in the art as MULTILAM. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

We claim:

1. A keybar voltage and current reduction apparatus for use in a power generator comprising a stator having an outer surface, a plurality of keybars coupled to the outer surface, and a stator core, the keybar voltage and current reduction apparatus comprising:
   a plurality of keybar shields for the coupling of a magnetic field, each keybar shield being mechanically coupled to the outer surface of the stator, each keybar shield being an electrical conductor; and
   a keybar shunt electrically coupling at least two of the keybar shields, the keybar shunt being flexible for expanding and contracting during operation of the power generator, the keybar shunt being an electrical conductor.

2. The keybar voltage and current reduction apparatus of claim 1, wherein the stator core has stator slots formed in its outer surface and each keybar shield of the plurality of keybar shields is disposed in one of the stator slots.

3. The keybar voltage and current reduction apparatus of claim 2, wherein each keybar shield of the plurality of keybar shields comprises a dovetail shape and the corresponding stator slots comprise an inverse dovetail shape for mating with the dovetail shape of respective keybar shields.

4. The keybar voltage and current reduction apparatus of claim 1, wherein each keybar shield of the plurality of keybar shields is disposed between one of the keybars and the stator.

5. The keybar voltage and current reduction apparatus of claim 1, wherein each keybar shield of the plurality of keybar shields is affixed to an outer surface of the stator by a high temperature adhesive.

6. The keybar voltage and current reduction apparatus of claim 1, wherein a length of each keybar shield of the plurality of keybars shields is approximately an axial length of the stator core.

7. The keybar voltage and current reduction apparatus of claim 6, wherein the length of each keybar shield is shorter than the axial length of the stator core.

8. The keybar voltage and current reduction apparatus of claim 1, wherein the keybar shields are mechanically attached to the stator core and one or more flexible keybar shunts, and the keybar shields are mechanically isolated from other generator components.

9. The keybar voltage and current reduction apparatus of claim 1, wherein the flexible keybar shunt further electrically couples one of the keybars.

10. The keybar voltage and current reduction apparatus of claim 1, wherein the flexible keybar shunt couples the coupled keybar shields at an axial end of each coupled keybar shield.

11. The keybar voltage and current reduction apparatus of claim 1, wherein the flexible keybar shunt comprises corrugated wire.

12. The keybar voltage and current reduction apparatus of claim 1, wherein the flexible keybar shunt comprises a flexible strip.

13. The keybar voltage and current reduction apparatus of claim 12, wherein the flexible strip comprises a multi-contact strip.

14. The keybar voltage and current reduction apparatus of claim 1, wherein the flexible keybar shunt comprises a plurality of flexible strips banded together.

15. The keybar voltage and current reduction apparatus of claim 1, wherein the flexible keybar shunt comprises a helical spring.

16. The keybar voltage and current reduction apparatus of claim 1, wherein the flexible keybar shunt comprises a chain.

17. The keybar voltage and current reduction apparatus of claim 1, wherein the flexible keybar shunt comprises a wire braid.

18. The keybar voltage and current reduction apparatus of claim 1, wherein the flexible keybar shunt comprises wire fabric.

19. A power generator comprising:
   a stator having an outer surface and a stator core;
   a rotor rotatably disposed inside of the stator;
   a plurality of keybars mechanically coupled to the outer surface of the stator;
   a plurality of keybar shields mechanically coupled to an outer surface of the stator, each keybar shield being an electrical conductor; and a keybar shunt electrically coupling at least two of the keybar shields, the keybar shunt being flexible for expanding and contracting during operation of the power generator, the keybar shunt being an electrical conductor;

wherein a rotation of the rotor induces a magnetic field that is coupled into the keybar shields, and wherein a magnetic field that is coupled into a keybar of the plurality of keybars is less a magnetic field that would be coupled into the keybar in the absence of the keybar shields.

20. The power generator of claim 19, wherein the stator has stator slots formed in its outer surface and at least some of the keybar shields are each disposed within one of the stator slots.

21. The power generator of claim 19, wherein each keybar shield of the plurality of keybar shields comprises a dovetail shape and the corresponding stator slot for each keybar shield comprises an inverse dovetail shape for mating with the dovetail shape.

22. The power generator of claim 19, wherein at least some of the keybar shields are each disposed between one of the keybars and the stator.

23. The power generator of claim 19, wherein at least some of the keybar shields are each affixed to the outer surface of the stator by a high temperature adhesive.

24. The power generator of claim 19, wherein a length of each keybar shield of the plurality of keybars shields is approximately an axial length of the stator core.

25. The power generator of claim 24, wherein the length of each keybar shield of the plurality of keybar shields is shorter than the axial length of the stator core.

26. The power generator of claim 19, wherein the keybar shunt couples the coupled keybar shields at an axial end of each coupled keybar shield.

27. The power generator of claim 19, wherein the keybar shunt is disposed near an axial end of the stator core.

28. The power generator of claim 19, wherein the keybar shunt is coupled to each coupled keybar shield via a brazed connection.

29. The power generator of claim 19, wherein the flexible keybar shunt comprises a corrugated wire.

30. The power generator of claim 19, wherein the flexible keybar shunt comprises a flexible strip.

31. The power generator of claim 30, wherein the flexible strip comprises a multi-contact strip.

32. The power generator of claim 19, wherein the flexible keybar shunt comprises a plurality of flexible strips banded together.

33. The power generator of claim 19, wherein the flexible keybar shunt comprises a helical spring.

34. The power generator of claim 19, wherein the flexible keybar shunt comprises a chain.

35. The power generator of claim 19, wherein the flexible keybar shunt comprises a wire braid.

36. The power generator of claim 19, wherein the flexible keybar shunt comprises wire fabric.

37. A keybar voltage and current reduction apparatus for use in a power generator comprising a stator having an outer surface, a stator core having a pair of axial ends, and a plurality of keybars coupled to the outer surface of the stator, the keybar voltage and current reduction apparatus comprising:

a plurality of electrically conductive keybar shields coupled to the outer surface of the stator; and a keybar shunt electrically coupling at least two of the keybar shields, the keybar shunt being disposed between the axial ends of the stator core.

38. The keybar voltage and current reduction apparatus of claim 37, wherein the keybar shunt comprises a flexible shunt for expanding and contracting during operation of the power generator.

39. The keybar voltage and current reduction apparatus of claim 38, wherein the flexible keybar shunt comprises a shunt selected from the group consisting of corrugated wire, a flexible strip, a multi-contact strip, a plurality of flexible strips banded together, a helical spring, a chain, a wire braid, and wire fabric.

40. The keybar voltage and current reduction apparatus of claim 37, wherein a length of each keybar shield of the plurality of keybars shields is approximately an axial length of the stator core.

41. The keybar voltage and current reduction apparatus of claim 37, wherein the length of each keybar shield is shorter than the axial length of the stator core.

42. The keybar voltage and current reduction apparatus of claim 37, wherein the keybar shields are mechanically attached to the stator core and one or more keybar shunts, and the keybar shields are mechanically isolated from other generator components.

43. A power generator comprising:

a stator having a stator core, the stator core having a pair of axial ends;

a plurality of keybars coupled to an outer surface of the stator;

a plurality of electrically conductive keybar shields coupled to the outer surface of the stator; and a keybar shunt electrically coupling at least two of the keybar shields, the keybar shunt being disposed between the axial ends of the stator core.

44. The power generator of claim 43, wherein the keybar shunt comprises a flexible shunt for expanding and contracting during operation of the power generator.

45. The power generator of claim 44, wherein the flexible keybar shunt comprises a shunt selected from the group consisting of corrugated wire, a flexible strip, a multi-contact strip, a plurality of flexible strips banded together, a helical spring, a chain, a wire braid, and wire fabric.

46. The power generator of claim 43, wherein a length of each keybar shield of the plurality of keybars shields is approximately an axial length of the stator core.

47. The power generator of claim 43, wherein the length of each keybar shield is shorter than the axial length of the stator core.

48. The power generator of claim 43, wherein the keybar shields are mechanically attached to the stator core and one or more keybar shunts, and the keybar shields are mechanically isolated from other generator components.

* * * * *